(12) United States Patent
Hale

(10) Patent No.: US 6,270,260 B1
(45) Date of Patent: Aug. 7, 2001

(54) ANTI-ROTATIONAL BEARING DEVICE

(75) Inventor: David W. Hale, El Paso, TX (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/443,775

(22) Filed: Nov. 19, 1999

(51) Int. Cl.[7] .................................................. F16C 43/00

(52) U.S. Cl. ................................. 384/537; 384/906

(58) Field of Search .................................. 384/906, 537, 384/535, 510, 559, 517, 584, 585; 310/89, 90

(56) References Cited

U.S. PATENT DOCUMENTS

| | | | |
|---|---|---|---|
| 2,877,068 | * | 3/1959 | Schaefer ................................ 384/537 |
| 3,182,379 | * | 5/1965 | Bachelet et al. ................. 384/537 X |
| 3,655,252 | * | 4/1972 | Crecelius ............................. 384/537 |
| 4,384,226 | * | 5/1983 | Sato et al. ............................. 310/89 |
| 4,938,452 | * | 7/1990 | Imamura et al. ................ 384/585 X |
| 5,482,384 | * | 1/1996 | Lyle ..................................... 384/537 |

* cited by examiner

Primary Examiner—Thomas R. Hannon
(74) Attorney, Agent, or Firm—Michael Best & Friedrich, LLP

(57) ABSTRACT

An anti-rotational bearing assembly including a bearing positioned in a bearing bore of a bearing hub and a bearing cap connected to the bearing. The bearing cap including a projecting portion which abuts a boss extending from the bearing hub to prevent rotation of the bearing.

30 Claims, 3 Drawing Sheets

ANTI-ROTATIONAL BEARING DEVICE

BACKGROUND OF THE INVENTION

The present invention relates to bearings and methods of preventing bearing outer race creepage. One prior art embodiment utilizes a ball bearing which is welded to the outer race of the bearing. The bearing is installed in a lead-end bracket housing. A tab is assembled to the bracket housing adjacent to the bearing cavity via a self-tapping screw. Since the bearing on this prior art design is recessed below the surface of the bearing cavity hub and the tab, the ball, which is attached to the outer bearing race, extends above this surface. Thus, interference with the tab occurs and eliminates radial rotation. The design flaw of this "welded" approach is the potential damage to the outer race due to heating generated in the welding process. Bearing manufacturers will not warranty this extreme modification of their design.

Another design flaw pertains to the motor shaft-to-bearing interface. Since the lead-end bearing must be "pre-installed" into the bearing cavity, the shaft bearing journal must therefore "slip-fit" into the bearing inner race. This method contradicts the bearing manufacturer's recommendations of "press-fitting" the bearings onto the rotating member of the machine. In other words, unless the bearing inner-race is pressed onto the shaft journal, "wallowing" or "slipping" of the shaft-bearing interface occurs. This results frequently in premature failures.

What is needed, then, is a device for overcoming these problems, and which particularly avoid problems associated with heat due to welding.

SUMMARY OF THE INVENTION

The present invention comprises an interference between a motor and a rotatable shaft. The interference includes a bracket, a bearing, and a bearing cap. The bracket is connected to the motor and defines a bearing bore. A bearing is positioned in the bearing bore and a bearing cap is connected to the bearing. Preferably, the bearing cap comprises a tang extending from a cover, wherein the bearing bore hub includes a boss positioned to prevent the tang from rotating.

The present invention also comprises a bearing anti-rotation apparatus and a bearing cap. It will be apparent to those skilled in the art that the present invention also comprises various methods of preventing wallowing and rotation of bearings.

Accordingly, an object of the present invention is to prohibit bearing outer race creepage.

Another object of the present invention is to eliminate potential damage due to welding.

Another object of the present invention is to reduce the "wallowing" or "slipping" in the shaft-bearing interface. This object is accomplished in one embodiment by pressing the bearing inner-race onto the shaft journal.

Another object of the present invention is to avoid premature failures.

Another object of the present invention is to assemble bearings in accordance with bearing manufacturers recommendations.

Another object of the present invention is to compensate for thermal expansion due to motor windings and bearing losses.

Other objects and advantages of the present invention will be apparent to those of skill in the art from the teachings disclosed herein.

DESCRIPTION OF THE PREFERRED EMBODIMENTS

Figure 1:
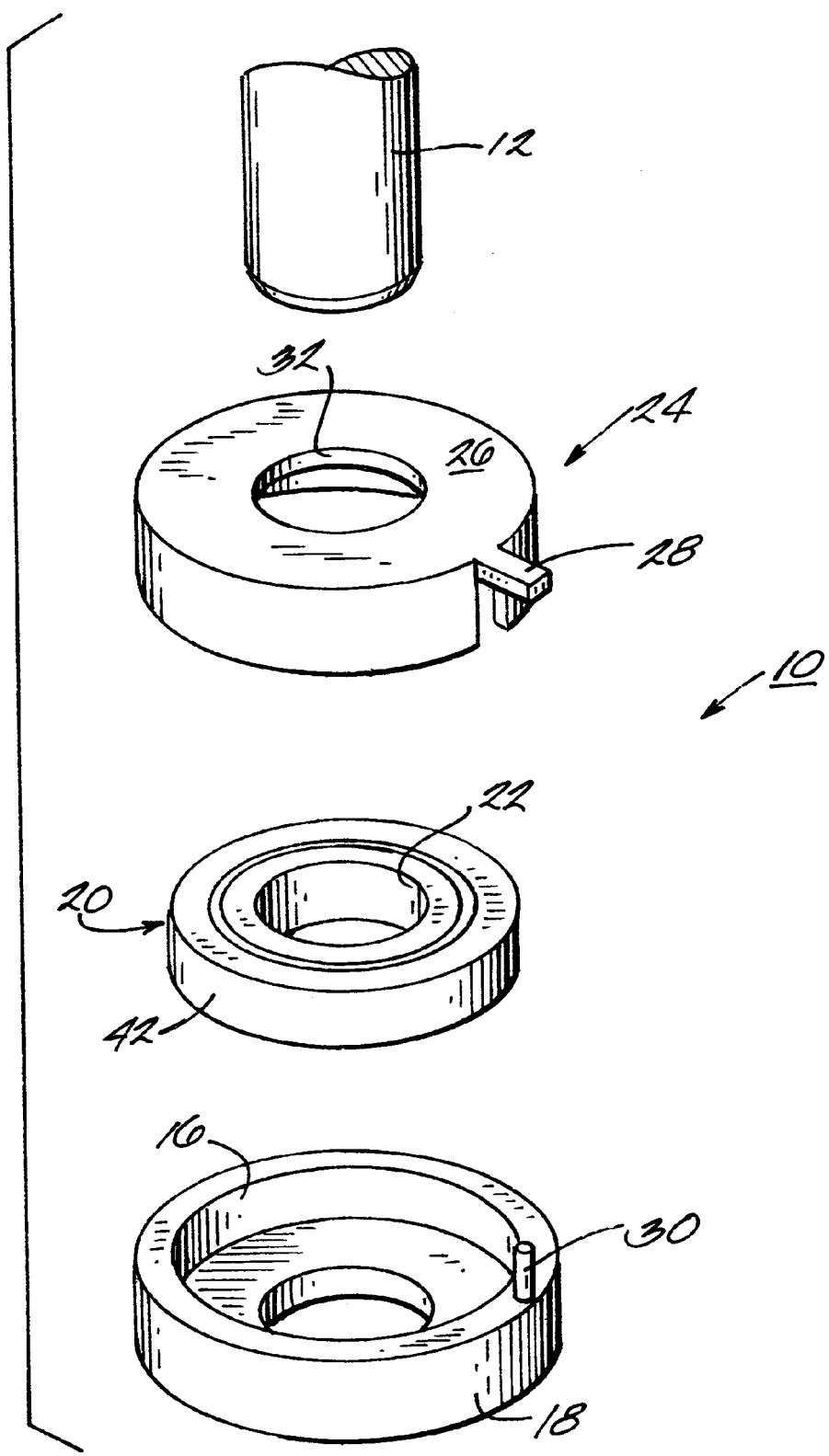
FIG. 1 shows an exploded perspective view of an interface according to the present invention.

The present invention is related to bearings and interfaces between motors and structures having a rotatable shaft, such as pumps.

Select embodiments of the present invention are particularly optimized to the pool pump market. One problem which has plagued the pool pump industry since the early 1980's is the "wallowing" or "beating" out of the motor lead-end (opposite the pump end) bearing bore. The motor No. 203 or No. 304 drive-end (pump end) bearing is locked in order to hold the shaft extension dimension due to various radial and axial loads subject to the shaft. This also maintains the impeller distance from the pump housing for optimum pump performance. The lead-end bearing is allowed to move axially in the bearing bore to allow for thermal expansion. Thermal expansion in a dual locked bearing could lead to motor seizure. This lead-end bearing also has a pre-load spring in the bottom of the bore that exerts pre-load to bearing. This helps eliminate or reduce the noise.

The wallowing occurs when the outer ball bearing race creeps and spins radially within the lead-end (opposite the pump end) bracket housing. This failure mode occurs once the bearing area experiences an increase in temperature due to both motor winding and bearing losses. Since the coefficient of thermal expansion is greater in the aluminum bracket housing versus the bearing outer race, a clearance gap is created during this temperature increase which allows outer-race creepage within the bore.

Once the bearing is pressed into the motor shaft, with a cap facing towards the rotor, the motor is assembled by inserting the shaft-bearing assembly into the bracket housing. Once the motor is in service, and radial creepage of the bearing outer race occurs, the cap will rotate only until the tab (or tang) interferes with the cast bracket boss projection.

Exemplary embodiments of the invention are described with reference to the attached drawings wherein like reference numerals refer to like parts.

FIG. 1 shows an interface 10 according to the present invention. Interface 10 is located between a motor (not shown) and a structure having a rotatable shaft 12. The interface 10 comprises a bracket 14 (best shown in FIG. 6) connected to the motor and defining a bearing bore 16. The bearing bore 16 shown in FIG. 1 includes a bearing hub 18. A bearing 20 is positioned in the bearing bore 16. This is shown well in FIG. 5. Bearing 20 defines a central hole 22 for receiving the rotatable shaft 12.

Figure 5:
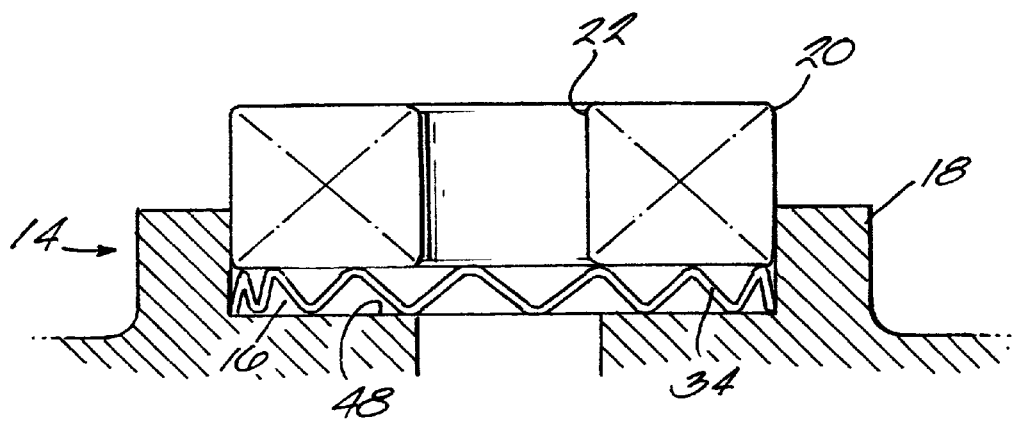
FIG. 5 shows a cross-section view of a bearing seated in a bearing bore. The bearing is axially pre-loaded with a pre-load spring.

The interface 10 further comprises a bearing cap 24 connected to the bearing 20. The bearing cap 24 shown in FIG. 1 comprises a bearing cap cover 26 and a tang 28 extending from the cover 26. The bearing bore 16 bearing hub 18 comprises a boss 30 positioned to prevent the tang 28 from rotating. Preferably, the bearing cap 24 cover 26 defines a hole 32 for receiving the rotatable shaft 12. Preferably, the cover 26 is press fitted onto the bearing 20 and the bearing 20 is allowed to move axially in the bearing bore 16. FIG. 5 shows an embodiment of the interface 10 comprising a pre-load spring 34 between the bearing 20 and the bearing bore 16.

Figure 2:
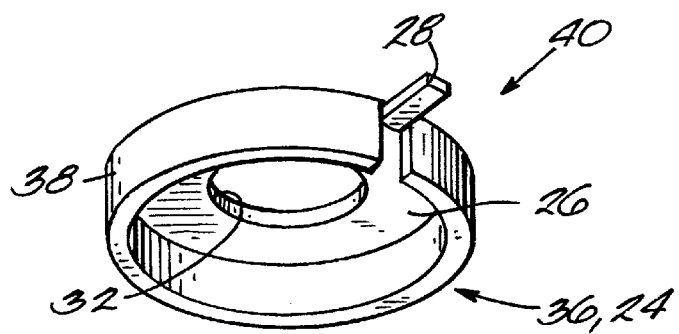
FIG. 2 depicts a perspective view of a bearing cap adapted to fit on a bearing.
Figure 3:
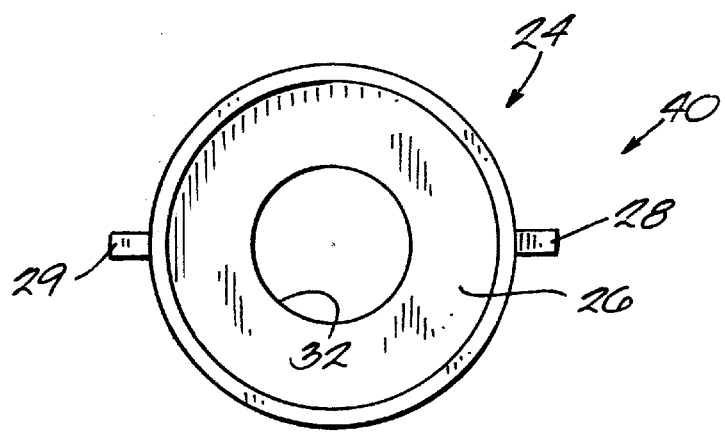
FIG. 3 shows a plan view of a bearing cap similar to the one shown in FIG. 2.

FIG. 2 shows a bearing anti-rotation apparatus 36 substantially similar to the bearing cap 24 shown in FIG. 1. The bearing anti-rotation apparatus 36 is adapted to operate with a bearing 20 and a bearing bore 16. The apparatus 36 comprises a cover 26 defining a hole 32 wherein the cover 26 is adjacent the bearing 20. The apparatus 36 further comprises an edge 38 depending from the cover 26 and sized to fit around the bearing 20. Apparatus 36 further comprises a projection 40 extending from the cover 26, whereby the projection 40 prevents rotation of the bearing 20. The projection 40 shown in FIGS. 2 and 3 is a tang 28. Other operable projections will be apparent to those of skill in the art. Referring to FIG. 1, the projection 40 (shown as tang 28 in FIG. 1) prevents rotation of a bearing 20 by contacting the boss 30.

Figure 4:
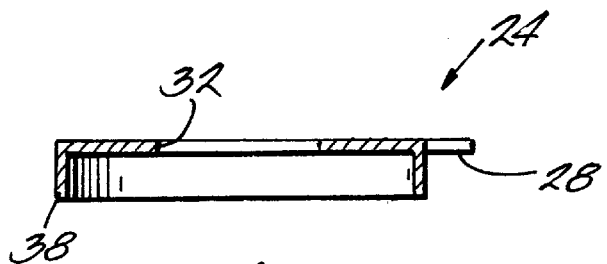
FIG. 4 shows a cross-section side view of the bearing cap shown in FIG. 3.

FIGS. 2, 3, and 4 show views of the bearing cap 24. In FIG. 2, the bearing anti-rotation apparatus 36 is a bearing cap 24. FIG. 3 shows a plan view of the bearing cap 24 substantially similar to the bearing cap 24 shown in FIG. 2. However, FIG. 3 illustrates that the bearing cap 24 can include a second tang 29 which is opposite the first tang 28 and which also extends from the cover 26. FIG. 4 shows a cross-section of the bearing cap 24.

Figure 6:
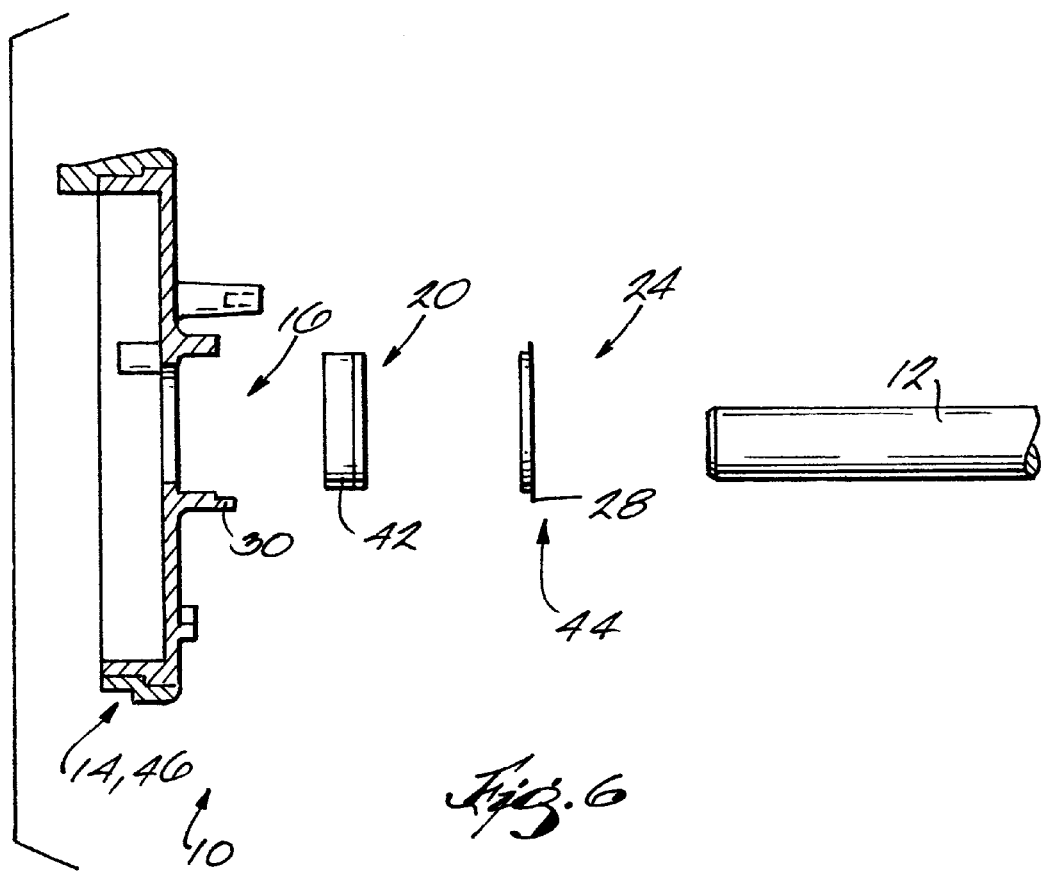
FIG. 6 shows an exploded side view of a bearing assembly and an exploded side view of an interface similar to the one shown in FIG. 1.

It will be apparent to those skilled in the art that the present invention also comprises a method of preventing wallowing, or beating of a motor bore (not shown) comprising the steps of preventing outer ball bearing race creepage. The method also comprises pressing a bearing cap 24 onto a bearing 20 wherein the bearing cap 24 includes a tang 28 extending beyond an outer race 42 of the bearing 20. The bearing 20 is pressed onto a shaft 12 of the motor (not shown) to form a shaft-bearing assembly 44. The shaft-bearing assembly 44 is shown in exploded view in FIG. 6. The shaft-bearing assembly 44 is inserted into a bracket housing 46. The bracket housing 46 shown in FIG. 6 is a bracket 14. The bracket housing 46 includes a boss 30 positioned to interfere with the rotation of the tang 28. Other operable brackets and bosses will be apparent to those of skill in the art.

The method, in some embodiments, comprises the step of allowing the bearing 20 to move axially in the bearing bore 16. Preferably, the method includes the step of reducing noise by pre-loading the bearing 20. The step of pre-loading the bearing, in some embodiments, comprises axially pre-loading the bearing 20 with a pre-load spring 34 in a bottom 48 of the bearing bore 16. See FIG. 5.

Thus, although there have been described particular embodiments of the present invention of a new and useful "Anti-Rotational Bearing Device," it is not intended that such references be construed as limitations upon the scope of this invention except as set forth in the following claims.

What is claimed is:

1. A bearing anti-rotation apparatus adapted to operate with a bearing and a bearing bore, the apparatus comprising:
   a cover defining a hole, wherein the cover is adjacent the bearing;
   an edge depending from the cover and sized to fit around the bearing;
   a projection extending from the cover, whereby the projection prevents rotation of the bearing; and
   a boss extending upward from the bearing bore, wherein the bearing is positioned in the bearing bore.

2. The apparatus of claim 1, wherein the projection prevents rotation of the bearing by contacting the boss.

3. The apparatus of claim 1, wherein the hole of the cover receives a rotatable supported by the bearing.

4. The apparatus of claim 1, wherein the boss extends upward from the bearing hub which defines the bearing bore.

5. The apparatus of claim 1, further comprising a second projection extending from the cover to further prevent rotation of the bearing.

6. The apparatus of claim 1, wherein the projection prevents rotation of the cover by contacting the boss.

7. The apparatus of claim 1, wherein the bearing is allowed to move axially in the bearing bore.

8. The apparatus of claim 1, further comprising a pre-load spring positioned within bearing bore beneath the bearing.

9. The apparatus of claim 1, wherein the bearing does not rotate relative to the cover.

10. The apparatus of claim 9, wherein the cover is press fitted onto the bearing.

11. An interface between a motor and a structure having a rotatable shaft, the interface comprising:
    a bracket connected to the motor and defining a bearing bore, wherein the bearing bore includes a bearing hub;
    a bearing positioned in the bearing bore; and
    a bearing cap connected to the bearing.

12. The interface of claim 11, wherein the bearing cap comprises a cover and a tang extending from the cover.

13. The interface of claim 12, wherein the bearing bore bearing hub comprises a boss positioned to prevent the tang from rotating.

14. The interface of claim 13, further comprising a second tang extending from the cover, wherein the second tang is also prevented from rotating.

15. The interface of claim 12, wherein the bearing cap cover defines a hole for receiving the rotatable shaft.

16. The interface of claim 12, wherein the cover is press-fitted on to the bearing.

17. The interface of claim 11, wherein the bearing is allowed to move axially in the bearing bore.

18. The interface of claim 17, comprising a pre-load spring between the bearing and the bearing bore.

19. The interface of claim 11, wherein:
    the bearing cap comprises a cover press-fitted on to the bearing and defining a hole for receiving the rotatable shaft, and a tang extending from the cover;
    the bearing bore hub comprises a boss positioned to prevent the tang from rotating; and
    the bearing is allowed to move axially in the bearing bore.

20. The interface of claim 19, comprising a pre-load spring between the bearing and the bearing bore.

21. The interface of claim 11, wherein the rotatable shaft is supported by the bearing.

22. The interface of claim 11, wherein the bearing does not rotate relative to the bearing cap.

23. An anti-rotational bearing assembly comprising:
   a bearing hub defining a bearing bore, the bearing hub having a surface surrounding the bore and a boss extending from the surface;
   a bearing seated in the bearing bore; and
   a bearing cap having a cover with a edge depending from the cover and sized to fit around the bearing such that the bearing cap is press fitted onto the bearing, the bearing cap further having a projection extending from the cover such that the projection prevents rotation of the bearing by contacting the boss.

24. The assembly of claim 23, further comprising a second projection extending from the cover to further prevent rotation of the bearing.

25. The assembly of claim 23, wherein the bearing is allowed to move axially in the bearing bore.

26. The assembly of claim 23, further comprising a pre-load spring positioned within the bearing bore beneath the bearing.

27. A method of preventing wallowing of a motor bore comprising the steps of
   preventing outer ball bearing race creepage;
   pressing a bearing cap onto a bearing, wherein the bearing cap includes a tang extending beyond an outer race of the bearing;
   pressing the bearing onto a shaft of the motor to form a shaft-bearing assembly; and
   inserting the shaft-bearing assembly into a bracket housing, wherein the bracket housing includes a boss positioned to interfere with rotation of the tang.

28. The method of claim 27, comprising the step of allowing the bearing to move axially in the bearing bore.

29. The method of claim 27, comprising the step of reducing noise by pre-loading the bearing.

30. The method of claim 29, wherein the step of pre-loading the bearing comprising axially pre-loading the bearing with a pre-load spring in a bottom of the bearing bore.

* * * * *